Figure 1:
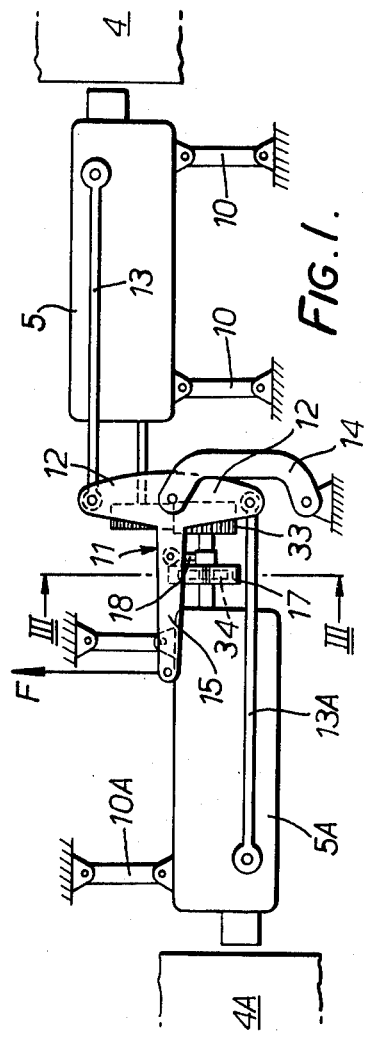

United States Patent [19]

Harrison

[11] 4,082,165
[45] Apr. 4, 1978

[54] BRAKE ASSEMBLY INCLUDING MOUNTING, ACTUATING AND ADJUSTING STRUCTURE

[75] Inventor: Anthony William Harrison, Birmingham, England

[73] Assignee: Girling Limited, Birmingham, England

[21] Appl. No.: 693,799

[22] Filed: Jun. 8, 1976

[30] Foreign Application Priority Data

Jun. 9, 1975  United Kingdom .............. 24695/75

[51] Int. Cl.² ........................................ B61H 15/00
[52] U.S. Cl. .................................... 188/59; 188/71.1;
   188/71.3; 188/71.9; 188/72.8; 188/72.9;
   188/196 BA; 188/202; 192/111 A
[58] Field of Search ...................... 188/202, 71.1, 71.3,
   188/71.9, 72.8, 72.6, 72.9, 196 BA, 52, 53, 54,
   55, 59; 192/995, 111 A

[56] References Cited

U.S. PATENT DOCUMENTS

| 434,874 | 8/1890 | Lawrence | 188/54 |
| 671,787 | 4/1901 | Anger | 188/202 |
| 1,812,184 | 6/1931 | Walsh | 188/196 BA |
| 2,002,139 | 5/1935 | Rosiers | 188/196 BA |
| 2,888,102 | 5/1959 | Eksergian et al. | 188/71.9 |
| 3,160,242 | 12/1964 | Feuilly | 188/196 BA X |
| 3,499,507 | 3/1970 | Scott et al. | 188/52 |
| 3,612,224 | 10/1971 | Walther | 188/71.1 |
| 3,702,125 | 11/1972 | Jeffries | 188/72.9 X |
| 3,964,579 | 6/1976 | Harrison | 188/71.9 |

FOREIGN PATENT DOCUMENTS

| 1,154,893 | 6/1969 | United Kingdom | 188/71.9 |
| 1,150,862 | 5/1969 | United Kingdom | 188/59 |

Primary Examiner—George E. A. Halvosa
Attorney, Agent, or Firm—Scrivener, Parker, Scrivener & Clarke

[57] ABSTRACT

A brake assembly comprises opposed brake parts arranged to be applied in unison to associated rotor surfaces. Each brake part comprises a friction pad or shoe and an adjustable length strut which transmits brake-actuating forces to the friction pad and which adjusts the position of the friction pad relative to the rotor surface to compensate for wear. Also provided is an equalizing device which ensures that the lengths of the adjustable struts are adjusted equally.

9 Claims, 5 Drawing Figures

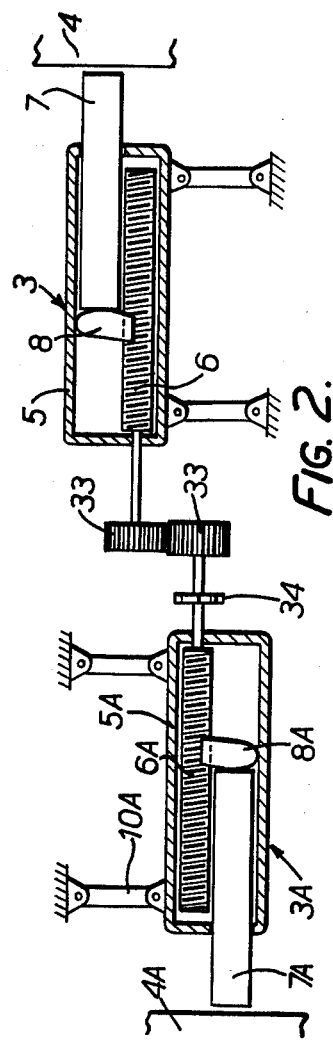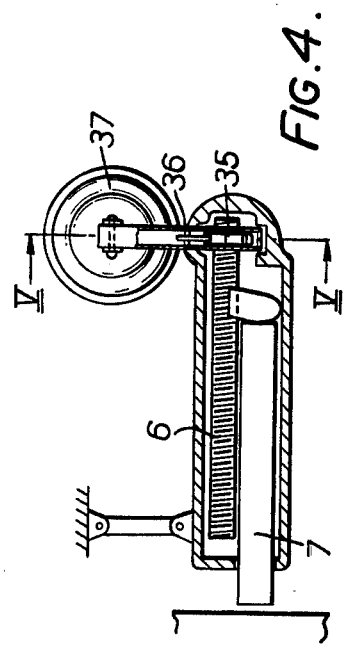

BRAKE ASSEMBLY INCLUDING MOUNTING, ACTUATING AND ADJUSTING STRUCTURE

This invention relates to brake assemblies having friction members which act in different directions on opposed rotor braking surfaces.

The braking surfaces may be on the same rotor, for example as in disc brakes, or on different rotors, for example as in a railway disc brake which extends between opposed wheels of a wheel and axle set, the friction members being clamped against the inner surfaces of the wheels or of discs rotatable with the wheels.

Such brake assemblies usually have friction members arranged in clamp-load equalizing sets, usually pairs, so that the friction members of each set are applied with equal clamp loads, and adjusting means are generally provided to adjust the friction members to compensate for wear. Normally, the brake actuating force for each friction member is transmitted from an actuating member through an abutment which is in engagement with the friction member. The abutment, which may take the form of a nut on a screw thread, moves under the action of the adjusting means relative to the actuating member towards the rotor surface as the friction member wears, thus moving the friction member relative to the actuating member.

In accordance with the present invention, there is provided a brake assembly comprising a plurality of brake parts arranged to be applied in unison to associated rotor surfaces, each brake part comprising a body of friction material, an adjustable length strut co-operating with the friction material to transmit brake-actuating forces to the friction material and to adjust the position of the friction material relative to the rotor surface to compensate for wear, wherein the assembly further comprises equalizing means which ensure that the lengths of all the adjustable struts are adjusted equally.

Figure 5:
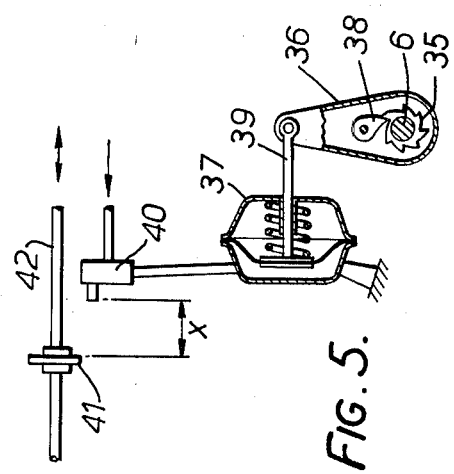
Figure 3:
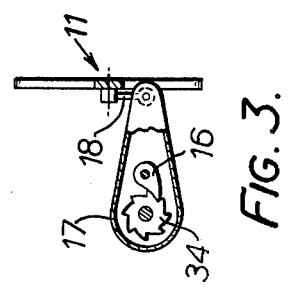

Two forms of brake assembly in accordance with the invention for a railway vehicle will now be described, by way of example, with reference to the accompanying drawings, in which:

FIG. 1 is a diagrammatic view of one form of brake assembly,

FIG. 2 is an axial sectional view of the assembly of FIG. 1 with part of the actuating mechanism and an adjustment device removed for clarity, FIG. 3 is a section taken along line III—III of FIG. 1, FIG. 4 is a diagrammatic, part sectional view of part of the other form of brake assembly, and FIG. 5 is a section taken along line V—V of FIG. 4 and showing additionally part of an adjuster actuating mechanism.

Each brake assembly comprises two brake actuating parts 3, 3A which are themselves identical and which act on respective wheels 4, 4A of the associated wheel and axle set. Corresponding elements of the brake parts will be allotted the same reference numerals, but with the elements of one of the parts having the suffix A. Each brake part comprises a tubular housing 5 within which is rotatably mounted an adjusting screw 6 which lies adjacent an elongate friction pad 7. An abutment in the form of a nut member 8 engages the inner end of the friction pad 7 and is screw-threadedly connected to the adjusting screw 6. The housing 5 is pivotally connected to a support structure by links 10 and is biased to a datum position away from the wheel 4 by a return spring (not shown).

In the assembly of FIGS. 1 to 3, adjusting screws 6, 6A are interconnected by meshing gears 33 which permits relative sliding movement of the screws 6, 6A to allow brake actuating movements of the housings 5, 5A.

The actuating mechanism comprises a member 11 having two arms 12 pivotally connected one to each housing 5, 5A through a link 13, 13A, the member 11 being pivotally connected through a link 14 to the support structure. A brake-applying force F is applied to the other arm 15 of member 11.

The adjuster device comprises a ratchet wheel 34 non-rotatably mounted on an extension of one of the screws 6, 6A and a pawl 16 pivotably mounted in a casing 17 rotatably mounted on the screw extension, the pawl 16 engaging the ratchet wheel. The casing 17 is pivotally connected to one end of a rod 18 the other end of which is connected to the arm 15 of member 11.

In operation, when the braking force is applied to member 11 it pivots about its connection with the link 14 and moves the pawl 16 relative to the ratchet wheel. If the movement is sufficient, due to excessive wear of the pads, the pawl picks up a new tooth and rotates the wheel 34 which causes rotation of screws 6, 6A by an equal amount. The abutments 8, 8A move equal distances and effect equal adjustment of both pads 7, 7A. The adjusting mechanism may be of any other suitable form.

In the assembly of FIGS. 4 and 5, the screw member 6 is connected through a uni-directional drive to an associated fluid operated motor 37. A similar arrangement is provided for the other part of the brake (not shown).

The uni-directional drive is similar to that described in the previous embodiment and comprises a ratchet wheel 35 engaging a pawl 38 pivotally mounted in a rotatable casing 36, the casing 36 being connected to an actuating rod 39 of the motor 37, as best seen in FIG. 5. The motor 37 is connected through a control valve 40 to a pressure source (not shown), the valve 40 being operable by an actuator 41 connected to a part 42 of the brake actuating linkage. When movement of the actuator 41 exceeds the distance x the valve 40 is operated and each motor 37 is actuated to rotate the casing 36 and, through the pawl and ratchet, adjust the pads 7, 7A. The fluid supplies to the motor 37 are connected together so that even if one motor tends to move first, both motors complete the full operating movement so that the adjustment of each friction pad will be the same.

The pawl and ratchet mechanism may be subjected to tolerances, and any errors due to such tolerances are overcome by ensuring that there is a lost motion in the stroke of the motor 37 which is greater than the tolerances. Thus, it can be easily ensured that the ratchet wheel of each brake part turns the same amount, say one tooth, when adjustment is required.

Although particularly described in relation to railway vehicle disc brakes which extend between opposed wheels of a wheel and axle set, the invention is applicable to other forms of brakes, for example external and internal drum brakes.

I claim:

1. A brake assembly comprising a plurality of brake parts, means for applying said parts in unison to respective, different rotors, said brake parts being arranged so that one only is applied to a respective rotor and each said brake part comprising a body of friction material, a separate adjustable length strut co-operating with each said body of friction material to transmit brake-actuating forces to said body of friction material and to adjust the position of said body of friction material relative to said rotor to compensate for wear, and a housing which carries both said body of friction material and said adjustable length strut therein, said housing, friction material and strut being movable in unison towards and away from the associated rotor surface to apply and release, respectively, said brake part; said body of friction material being supported by said housing close to its rotor surface whereby braking drag forces on said friction material are transmitted to said housing; and brake adjusting means separate from said applying means connected to each of said adjustable length struts to adjust the lengths thereof and including equalising means adapted to ensure that the lengths of all the adjustable struts are adjusted equally.

2. A brake assembly according to claim 1, further comprising a structure which is relatively fixed, wherein said housing is pivotally supported on said relatively fixed structure.

3. A brake assembly according to claim 1, wherein each adjustable length strut comprises an elongate screw which lies partially alongside said body of friction material, and an abutment member screwthreadedly connected to said screw and engaging said body of friction material, whereby rotation of the screw adjusts the length of the strut.

4. A brake assembly according to claim 3, wherein said equalizing means comprise a gear arrangement interconnecting all said screws, said gear arrangement being adapted to constrain all said screws to be rotated by predetermined relative amounts upon adjustment and to permit independent axial movement of said screws.

5. A brake assembly according to claim 4, wherein said gear arrangement comprises a plurality of intermeshing gears, one rigidly connected to each screw, and wherein said adjusting means includes an adjuster wheel which is rotatable in response to excess relative movement between the bodies of friction material, whereby rotation of said adjuster wheel effects rotation of each of said intermeshing gears.

6. A brake assembly according to claim 3, wherein said adjusting means comprises fluid motors, one associated with each screw, said screws being connected respectively to said fluid motors, means for operating each motor in response to excess relative movement between said bodies of friction material to rotate its associated screw, a single source of fluid pressure, and means connecting all said motors to said single pressure source whereby all said screws are rotated by predetermined relative amounts upon operation of said motors.

7. A brake assembly according to claim 6, wherein said adjusting means further comprises a uni-directional drive means, each motor being connected to its associated screw through the intermediary of said uni-directional drive means.

8. A brake assembly according to claim 7, wherein each said uni-directional drive means comprises a pawl and ratchet mechanism in which the normal pawl movement is greater than a whole numbermultiple of the distance between adjacent ratchet teeth.

9. The brake assembly of claim 1 including means responsive to wear of the friction material for automatically operating said adjusting means to adjust the lengths of said struts in unison.

* * * * *